United States Patent [19]

Quigley

[11] Patent Number: 4,795,491

[45] Date of Patent: Jan. 3, 1989

[54] PREMELTED SYNTHETIC SLAG FOR LADLE DESULFURIZING MOLTEN STEEL

[76] Inventor: Joseph R. Quigley, 7425 Ben Hur St., Pittsburgh, Pa. 15206

[21] Appl. No.: 37,942

[22] Filed: Apr. 13, 1987

[51] Int. Cl.⁴ .............................................. C21B 5/04
[52] U.S. Cl. .......................................... 75/257; 75/58
[58] Field of Search ......................................... 75/257

[56] References Cited

U.S. PATENT DOCUMENTS

| | | | |
|---|---|---|---|
| 2,609,289 | 9/1952 | McKinney | 75/58 |
| 2,767,084 | 10/1956 | Chandler | 75/58 |
| 3,301,663 | 1/1967 | Wicher | 75/58 |
| 4,566,916 | 1/1986 | Nagano | 75/257 |

Primary Examiner—Peter D. Rosenberg
Attorney, Agent, or Firm—Harry B. Keck

[57] ABSTRACT

A premelted synthetic slag for ladle desulfurizing molten steel and a related method for desulfurizing molten steel employ high MgO content calcium-aluminate synthetic slag. A preferred slag composition contains 0.1–3.0% by weight of vanadium oxide. A particularly preferred composition is the slag obtained from production of vanadium or ferrovanadium by aluminum reduction of vanadium oxides.

3 Claims, 2 Drawing Sheets

PREMELTED SYNTHETIC SLAG FOR LADLE DESULFURIZING MOLTEN STEEL

BACKGROUND OF THE INVENTION

1. Field of the Invention

The present invention relates to an improved premelted synthetic slag for ladle desulfurizing molten steel and more particularly to a premelted synthetic slag having an elevated magnesium oxide content and to the method for desulfurizing steel which employs the premelted synthetic slags and more particularly to a premelted synthetic slag for desulfurizing molten steel which synthetic slag is obtained as a co-product from vanadium and ferrovanadium processing.

2. Description of the Prior Art

Molten steel ladle metallurgical practices employ synthetic slag for desulfurization for a number of reasons. Synthetic slags provide a thermal insulation for the molten metal top surface and protect the molten metal from atmospheric oxidation. The synthetic slag ladle processing requires little additional equipment or additional capital costs. Synthetic slag ladle processing practices can achieve desulfurization as low as 0.005% (wt.) residual sulfur content and can remove 50% and more of the molten metal sulfur content. Such synthetic slags heretofore have had a high calcium oxide content and have included aluminum oxide, and occasionally calcium fluoride (as a flux), silicon dioxide and metallic aluminum or aluminum alloys. Improvements in the synthetic slag ladle processing of molten steel results when the synthetic slag is premelted to reduce the porosity and tendency to absorb moisture prior to use. Typically equal weights of calcium oxide and aluminum oxide are mixed and premelted together to form calcium aluminate. The premelted calcium aluminate is added to the ladle, either by itself, or with lime, fluorspar (to supply calcium fluoride) and occasionally some metallic aluminum.

Note that the premelted synthetic slag should be distinguished from prefused synthetic slag. The distinction is that prefused slag is created by a solid state reaction occurring at a temperature below the melting temperature of the slag. The resulting prefused synthetic slag tends to be porous and non-uniform. The premelted synthetic slag is obtained by actually melting the synthetic slag ingredients above their melting temperature to establish a liquid mixture which is allowed to cool to form the premelted synthetic slag.

To reduce the temperature required for melting synthetic slags, calcium fluoride as a fluxing agent frequently is added to the synthetic slag mixture. The presence of fluoride in the resulting slag tends to increase the wear on the refractory linings of molten steel ladles which are typically fabricated from cast dolomitic lime and/or high alumina ceramics and/or high MgO ceramics. Existing ladle practices encourage loss of magnesium oxide from the ladle lining into the ladle slag. Said loss requires frequent ladle lining replacement. The MgO loss can be detected by the increase of MgO content of the slag. Any process which lowers loss of MgO from the ladle lining will reduce the number of relinings and reduce the downtime needed to replace ladle linings.

Ferrovanadium Process

Vanadium is obtained by an exothermic reaction of metallic aluminum with vanadium concentrates. The ferrovanadium process is conducted in a crucible containing the vanadium concentrates and metallic aluminum. The reaction system is ignited by a thermite process comprising the combination of a metal such as aluminum or magnesium with an oxidizing agent. The ferrovanadium process comprises exothermic reaction of the metallic aluminum with the vanadium oxide to generate aluminum oxide as slag above a pool of molten vanadium. It is customary for the operator to add calcium oxide to the crucible to lower the slag melting temperatures and to promote separation of the molten metal.

Ferrovanadium slag tends to be high in MgO content. The MgO source is the ladle lining in most instances.

The three ferrovanadium slag products described herein as I, II and III were obtained from separate ferrovanadium slag processes wherein the operators provided differing quantities of calcium oxide.

STATEMENT OF THE PRESENT INVENTION

In its broadest aspect, the present invention provides premelted synthetic slag compositions having substantial quantities (9 to 20% by weight) of magnesium oxide. By including the magnesium oxide in a calcium aluminate slag, a reduced eutectic melting temperature for the ternary system (calcium oxide, aluminum oxide, magnesium oxide) can be achieved at temperatures corresponding to the calcium oxide/aluminum oxide eutectic temperature, e.g., 1400–1700 degrees C. Moreover the use of the magnesium oxide further avoids the ladle lining deterioration in ladle linings which contain MgO. A still further advantage is that magnesium oxide is less likely to absorb water of hydration than calcium oxide. Improved ladle processing can be expected from the avoidance of water in the ladle process.

In a further preferred embodiment of the present invention, the premelted synthetic slag is obtained directly as a by-product from the production of vanadium or ferrovanadium. Typical slags include 0.1 to 3.0 weight percent of vanadium oxides, possess low melting temperatures and possess relatively high magnesium oxide content.

By including magnesium oxide in a calcium aluminate slag, several advantages are obtained. The magnesium oxide replaces some of the calcium oxide and thereby retards magnesium oxide migration from the ceramic ladle linings into the slag. In addition, the magnesium oxide is less likely to absorb water of hydration than calcium oxide. Improved ladle processing can be expected from avoiding water in the ladle process.

However the presence of magnesium oxide increases the eutectic temperature of the ternary system: calcium oxide, magnesium oxide, aluminum oxide; hence increased MgO content in synthetic slags is counterindicated, because of the need to have low melting temperature slag.

The presence of small quantities of vanadium oxide in the synthetic slag appears to provide lower eutectic temperatures in the ternary system: calcium oxide, magnesium oxide, aluminum oxide. Accordingly in a prepared embodiment of the present invention, small quantities of vanadium oxide (0.1–3.0% by weight) are included in the synthetic slag to achieve heretofore unappreciated low eutectic temperatures.

In the preferred embodiment of the invention, the synthetic slag which will be employed for ladle desulfurizing molten steel is a slag obtained as a waste product from processing ferrovanadium. Such ferrovanadium slags include calcium oxide and aluminum oxide along with elevated quantities (9–20% by weight) of magnesium oxide and small but effective quantities of vanadium oxide (0.1–3.0 by weight).

A typical high magnesium oxide premelted synthetic slag has the following composition:

| | |
|---|---|
| $Al_2O_3$ | 44–85% by weight |
| CaO | 3–35% by weight |
| MgO | 9–20% by weight |
| $SiO_2$ | 0.1–3.0% by weight |
| Iron oxides | 0.05–1% by weight |
| Metals, oxides and inerts | <3% by weight |

The preferred premelted synthetic slags are obtained as the slag by-product from production of vanadium and ferrovanadium and include typically Ferrovanadium slag I (melting temperature approximately 1540 degrees C.):

| | |
|---|---|
| $Al_2O_3$ | 65% |
| MgO | 10–15% |
| CaO | 20–25% |
| $SiO_2$ | 1–3% |
| $Fe_2O_3$ | 0.3% |
| $V_2O_5$ | 0.1–1% |
| L.O.I.* | <.1% |

*L.O.I. means Loss on Ignition at 1000 degrees C., a customary test procedure.

Ferrovanadium slag II (melting temperature 1372 degrees C.):

| | |
|---|---|
| $Al_2O_3$ | 45–55% |
| MgO | 15–20% |
| CaO | 30–35% |
| $SiO_2$ | 2–4% |
| $V_2O_5$ | 0.2–1% |
| $MnO_2$ | 0.2% |
| $Fe_2O_3$ | 0.3% |
| L.O.I.* | None detected |

*L.O.I. means Loss on Ignition at 1000 degrees C., a customary test procedure.

Ferrovanadium slag III (melting temperature greater than 1717 degrees C.*):

| | |
|---|---|
| $Al_2O_3$ | 85% |
| MgO | 9% |
| CaO | 3% |
| $SiO_2$ | 2% |
| $V_2O_5$ | 0.5–1% |
| $Fe_2O_3$ | 0.5% |
| L.O.I. | <0.1% |
| B | <10 ppm |
| Mn | 100 ppm |
| Mo | 50 ppm |
| Ti | 100 ppm |
| Zr | 30 ppm |

*Note—The synthetic slag melting temperature exceeded the limit 1717 degrees C. of the available measuring equipment.

For comparison, a typical commercial premelted synthetic slag (melting temperature of 1398 degrees C.) has the following composition:

| | |
|---|---|
| $Al_2O_3$ | 51% |
| CaO | 48.0% |
| MgO | 0.2% |
| $SiO_2$ | 0.5% |
| $Fe_2O_3$ | 0.3% |

DESCRIPTION OF THE PREFERRED EMBODIMENTS

Figure 1:
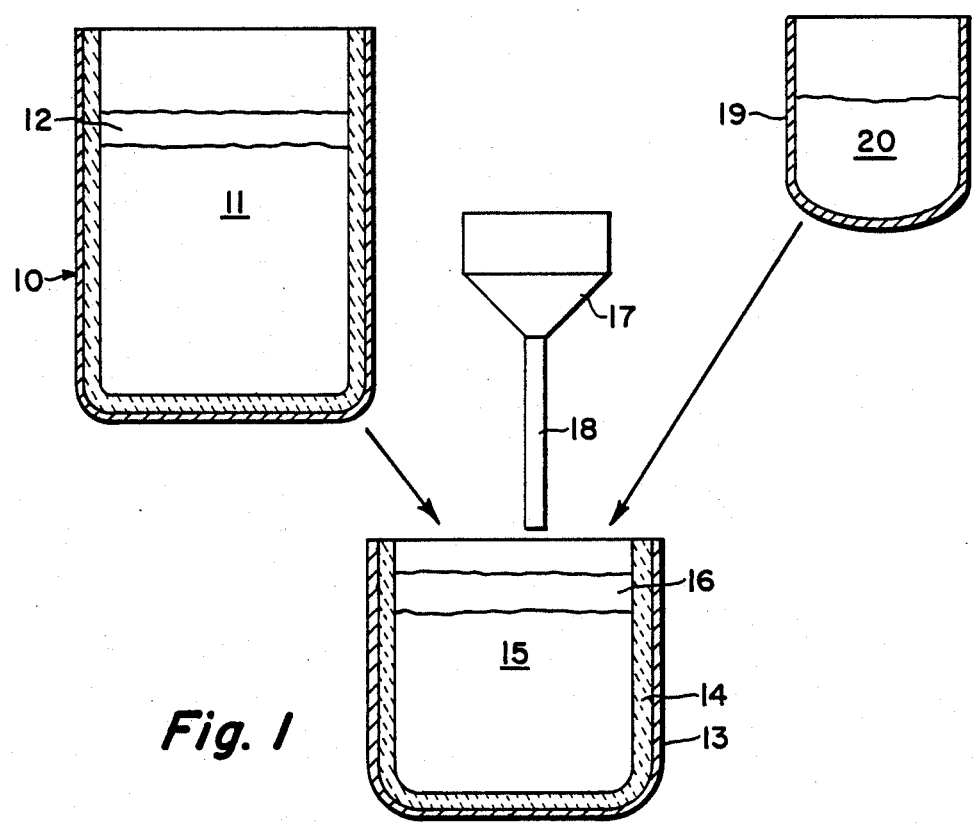
FIG. 1 is a schematic illustration of a typical ladle steel processing installation which can utilize the synthetic slag of this invention.

Referring to FIG. 1, there is illustrated an electric furnace 10 containing approximately 150 tons of molten steel 11 covered by a layer of slag 12. After the molten steel in the electric furnace 10 is in condition for further treatment, the molten steel is discharged into a ladle 13 having a ceramic lining 14 which is usually magnesium oxide and/or alumina and/or fused dolomitic lime. Usually a small part of the molten slag 12 from the electric furnace will accompany the molten steel 11 into the ladle 13. Within the ladle 13 the molten steel is identified by the numeral 15 and frequently constitutes about 150 tons of molten metal. The molten metal is covered by a synthetic slag 16 in accordance with the present invention.

The molten slag 16 is formulated by materials which may be added to a hopper 17 and delivered through a downspout 18 directly into the ladle 13. Alternatively slag-forming ingredients and metal treating reagents may be supplied from a charge bucket 19 and containing an inventory 20 of slag-forming and metal treating ingredients. Typically the charge bucket contains up to about 2.5 tons of materials.

EXAMPLE 1

The premelted synthetic slag herein described has been employed in a commercial steel ladle desulfurization process as follows:

In manufacturing 4118 grade steel in an electric furnace 10, the molten steel had a carbon content of 0.06 weight percent and a sulfur content of 0.034 weight percent. The ladle charge was approximately 250 tons of molten steel 15 together with approximately 4000 to 5000 pounds of carryover slag 16.

The charging bucket 19 contained 1000 pounds of desulfurizing mix including an 85% lime (balance powdered aluminum and fluorspar); 1000 pounds calcium-magnesium aluminate (described herein as Ferroaluminum slag II; and about 500 pounds of notchbar aluminum metal. All of the ingredients in the charge bucket 20 were introduced into the ladle and the ladle was transferred to a ladle refining station where additional heat was introduced into the ladle and aluminum dross containing about 40% metallic aluminum (balance aluminum oxide) was added to the ladle together with alloying ingredients (manganese, chrome). Argon gas was bubbled through the heat from the base of the reactor to facilitate desulfurization for about 35 minutes. The temperature of the metal within the ladle refining station was approximately 2900 degrees F. The sulfur content reduced from 0.034 to 0.016 weight percent.

Prior heats in the same installation without using the Ferrovanadium slag II utilized an additional 1000 pounds of desulfurization composition (85% lime, balance fluorspar and aluminum); an additional 150 pounds of notchbar aluminum; and and additional 1000 pounds of lime; and an additional 150 pounds of fluorspar. The cost effectiveness of using the Ferrovanadium slag II was established.

By conducting magnesium oxide measurements on the slag, it was determined that less magnesium oxide was leached out of the ladle ceramic liner when the Ferrovanadium slag II was employed than in prior heats which did not use the Ferrovanadium slag II.

EXAMPLE 2

In an electric furnace 10 containing 150 tons of molten steel, the contents were tapped into a ladle 13 having a fused cast dolomite refractory lining. Carryover slag 16 from the electric furnace 10 was about 3000 to 4000 pounds. While the molten metal was tapping from the electric furnace 10 into the ladle 13, a supply (500 to 600 pounds of Ferrovanadium slag III passing through a one inch screen) was introduced through a downspout 18 into the ladle. No other ingredients were added. The ladle was transferred for further treatment consisting of bubbling argon gas through the ladle and subsequently vacuum degassing the ladle contents.

Improved desulfurization of the molten metal was observed. Reduced refractory attack on the lining of the ladle was observed. The slag viscosity appeared to be lower when the Ferrovanadium slag III was employed.

This process of Example 2 has been employed with a number of different grades of steel under a variety of conditions.

Ternary Oxide Systems

Figure 2:
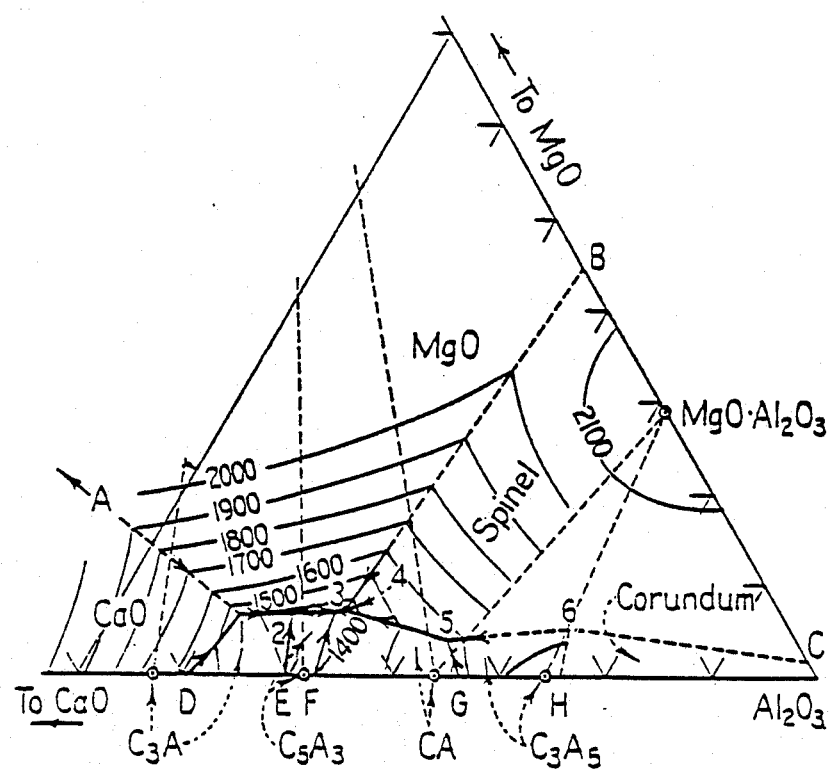
FIG. 2 is a ternary diagram of the system MgO, CaO, $Al_2O_3$.

FIG. 2 is a ternary graph of the system CaO, MgO, $Al_2O_3$ which appears in J. Am. Chem. Soc. 38, 568 (1916). It will be observed that the minimum melting temperature, approximately 1400 degrees C., occur at 50/50 $CaO/Al_2O_3$ composition with negligible MgO. It will be further observed that the melting temperatures for the ternary system containing 9-20 weight percent MgO ranges from about 1500 degrees C. to 1850 degrees C.

The presence of small amounts of vanadium oxide in the three component system has an unpredictable and surprising effect in reducing the melting temperatures to values of 1540 degrees C. (Slag 1), 1372 degrees C. (Slag II) and 1717 degrees C. (Slag III). It will be observed that Slag III has an $Al_2O_3$ content of 85% which indicates according to FIG. 2 melting temperatures above 2000 degrees.

The presence of at least 0.1 weight percent vanadium oxide in the ternary system CaO, MgO, $Al_2O_3$ appears to lower the eutectic temperatures of the system below the eutectic which is presented in the absence of the vanadium oxide.

I claim:

1. A premelted synthetic slag having a low melting temperature for desulfurizing molten steel comprising:

| | |
|---|---|
| $Al_2O_3$ | 44-85% by weight |
| CaO | 3-35% by weight |
| MgO | 9-20% by weight |
| $SiO_2$ | 0.1-3.0% by weight |
| Iron oxides | 0.05-1.0% by weight |
| Metals, oxides and inerts | <3% by weight |

2. A premelted synthetic slag having a low melting temperature for desulfurizing molten steel comprising:

| | |
|---|---|
| $Al_2O_3$ | 44-85% by weight |
| CaO | 3-35% by weight |
| MgO | 9-20% by weight |
| $SiO_2$ | 0.1-3.0% by weight |
| Iron oxides | 0.05-1.0% by weight |
| Vanadium oxide | 0.1-3.0% by weight |
| Metals, oxides and inert | <1.0% by weight | said synthetic slag having a lower eutectic temperature than a corresponding premelted synthetic slag which does not contain at least 0.1 weight percent vanadium oxide.

3. A premelted synthetic slag having a low melting temperature for desulfurizing molten steel comprising the slag obtained from production of vanadium or ferrovanadium by aluminum reduction of vanadium oxides comprising:

| | |
|---|---|
| $Al_2O_3$ | 44-85% by weight |
| MgO | 9-20% by weight |
| CaO | 3-35% by weight |
| $SiO_2$ | 1-4% by weight |
| Iron oxides | 0.1-1.0 by weight |
| Vanadium oxides | 0.1-3.0% by weight |
| Metals, oxides and inerts | <1.0% by weight |

* * * * *